No. 880,628. PATENTED MAR. 3, 1908.
A. B. CASE.
LAWN MOWER.
APPLICATION FILED DEC. 6, 1907.
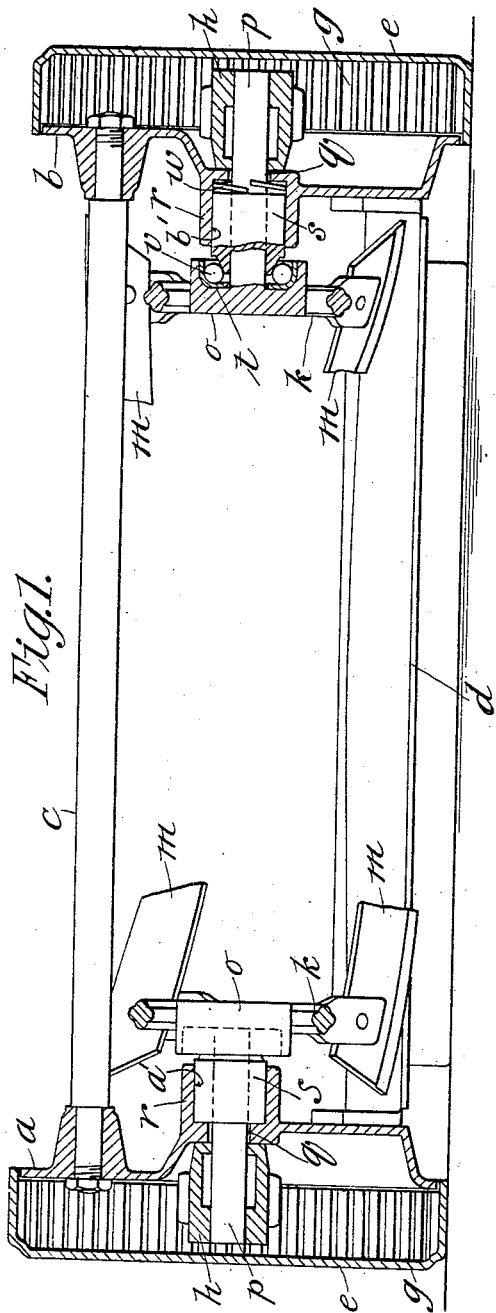
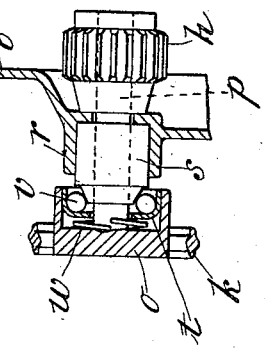
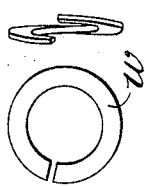
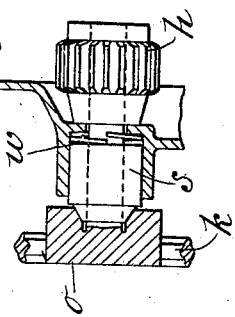
Witnesses:
H. L. Sprague
H. W. Bowen.
Inventor,
Adelbert B. Case.
by Chapin &co.
Attorneys.

UNITED STATES PATENT OFFICE.

ADELBERT B. CASE, OF SPRINGFIELD, MASSACHUSETTS.

LAWN-MOWER.

No. 880,628.  Specification of Letters Patent.  Patented March 3, 1908.

Application filed December 6, 1907. Serial No. 405,298.

*To all whom it may concern:*

Be it known that I, ADELBERT B. CASE, a citizen of the United States of America, residing at Springfield, in the county of Hampden and State of Massachusetts, have invented new and useful Improvements in Lawn-Mowers, of which the following is a specification.

This invention relates to lawn mowers and it is in the nature of a modification of the construction shown in my prior United States Letters Patent dated October 29, 1907 No. 869,771, and possesses certain novel features hereinafter fully described and claimed, the object of the invention being to provide a construction in which the salient novel features covered in my said prior patent may be applied to a somewhat different lawn mower construction.

In the drawings forming part of this application,—Figure 1 is a sectional elevation of a lawn mower taken through the axis of the revolving cutter, longitudinally thereof, certain parts of the bearings being shown in full lines. Fig. 2 is a sectional elevation in the same plane as Fig. 1 showing a portion of a cutter-head and a portion of the side plate of the lawn mower illustrating a modification of the construction of the bearings shown in Fig. 1. Fig. 3 is a view similar to Fig. 2 showing still another modification of the construction of the bearings shown in Fig. 1. Fig. 4 illustrates the preferred form of one of the elements of the invention.

Referring now to the drawings, $a$ and $b$ are the usual side plates of a lawn mower which, together with the rod $c$ and the stationary knife-bar $d$, constitute the frame of the machine,— $e$ and $f$ being the driving wheels provided with the internal rack $g$ with which a pinion $h$ on each end of the shaft of the revolving cutter meshes. These pinions, as usual, have a pawl and ratchet engagement with the shaft.

In the construction shown herein there is no cutter-shaft extending entirely through the revolving cutter lengthwise thereof but at each end of said cutter is a cutter-head $k$ consisting of the usual radially disposed arms to which the cutter blades $m$ are secured, these blades being riveted to the arms. The center of each cutter-head consists of a hub $o$ centrally of which a short shaft $p$ extends into and through each side plate at $q$, these short shafts $p$ being formed preferably integral with the hubs; and at that point where the shafts extend through the side plates $a$ and $b$, the hub-like projection $r$ is provided on said side plates. Each of these projections $r$ is recessed, as indicated at $a^1$ and $b^1$, to receive a cone $s$ which constitutes a part of a ball-bearing for the revolving cutter, and this cone has a close sliding fit axially of said cutter-shaft in said projection $r$.

In that side of the hub $o$ of the cutter-head facing the side plates $a$ and $b$, a recess is formed concentric with the shafts $p$ to receive ball-cups $t$, balls $v$ being interposed, as usual, between the tapered end of the cones and the ball-cup $t$; and back of the cone $s$ and between it and the base of the recess $a^1$ and $b^1$ in the side plate is placed a suitable spring $w$ (preferably in the form of a split washer, as shown in Fig. 4) whereby the tapered end of the cone $s$ will always be held in yielding contact with the balls $v$ in the hub of each cutter-head.

In constructing a lawn mower having a revolving cutter made in the manner described above, it is essential that the bearings for each end thereof shall lie as close to the cutter heads as possible and by constructing the cutter-head in such manner that its hub $o$ may constitute a part of the bearing therefor, it is possible to provide a bearing close to the cutter-head. This is a very desirable feature as far as the wear is concerned; and, furthermore, by the location of the bearings close to the cutter-heads and the location of the cutter-heads close to the point of support therefor in the side plates, it renders it unnecessary to use a very heavy steel in the construction of the blades $m$, as with the close bearings of large diameter provided in this construction, the revolving knife will be quite as rigid as though the shaft $p$ extended entirely through the revolving cutter.

In the construction shown in Fig. 1, only one spring $w$ is shown, said spring being omitted in the bearing on the opposite end of the revolving cutter. This is the preferred construction for the reason that a single spring can be used having sufficient expansive force to hold its own cone $s$ in yielding contact with the balls $v$, and through this contact, to force the balls $v$, in the opposite hub against the tapered end of the cone in the opposite side plate: But, if desired, a spring may be placed back of each cone.

In Fig. 2, a modification of the above construction is shown in which the hub o of the cutter-head is not recessed to receive a ball-race t, but said hub is provided with a tapered bearing for the end of the cone to enter. The spring w serves to hold the cone to its seat therein in the same manner as though balls were employed, as in Fig. 1. While this is not the most desirable construction from a mechanical point of view, it provides one feature that is entirely operative.

In Fig. 3 a further modification of the construction shown in Fig. 1 is illustrated. This is more properly a mere reversal of the position of the spring w shown in Fig. 1, the spring in Fig. 3 being placed behind the ball-cup t in the hub o of the cutter-head instead of behind the cone s in which position it is quite clear to be as entirely operative as in the construction shown in Fig. 1.

Fig. 4 shows the preferred means of maintaining the bearings of the revolving cutter in yielding contact.

What I claim, is:—

In a lawn mower, a suitable frame having oppositely placed rigid side plates, each plate supporting in a recess in same a non-rotary cone with the beveled portion thereof extending inwardly from each side plate; a revolving cutter between said side plates having spiral blades, a cutter-head with hub, at each end thereof, each hub being provided with a bearing in its outer end adapted to engage with the beveled portion of the non-rotary cone in each of said side plates, a cutter-shaft extending axially of each of said cutter-heads to, and freely through the non-rotary cone and supporting recess in each of said side plates; and means to maintain said non-rotary cone in yielding contact axially with the bearing in each of said cutter hubs.

ADELBERT B. CASE.

Witnesses:
K. I. CLEMONS,
H. W. BOWEN.